(12) United States Patent
Cord-Ruwisch et al.

(10) Patent No.: US 11,396,466 B2
(45) Date of Patent: Jul. 26, 2022

(54) WATER TREATMENT METHOD

(71) Applicant: MURDOCH UNIVERSITY, Murdoch (AU)

(72) Inventors: Ralf Cord-Ruwisch, Murdoch (AU); Liang Cheng, Murdoch (AU); Raphael Marie-Guillaume Flavigny, Murdoch (AU); Md Iqbal Hossain, Murdoch (AU)

(73) Assignee: BIOFILMTECH PTY LTD.

( * ) Notice: Subject to any disclaimer, the term of this patent is extended or adjusted under 35 U.S.C. 154(b) by 0 days.

(21) Appl. No.: 16/610,827

(22) PCT Filed: May 3, 2018

(86) PCT No.: PCT/AU2018/050406
§ 371 (c)(1),
(2) Date: Nov. 4, 2019

(87) PCT Pub. No.: WO2018/201194
PCT Pub. Date: Nov. 8, 2018

(65) Prior Publication Data
US 2020/0062627 A1   Feb. 27, 2020

(30) Foreign Application Priority Data
May 4, 2017 (AU) ................................ 2017901640

(51) Int. Cl.
*C02F 3/30* (2006.01)
*C02F 1/42* (2006.01)
(Continued)

(52) U.S. Cl.
CPC ............... *C02F 3/305* (2013.01); *C02F 1/42* (2013.01); *C02F 3/307* (2013.01); *C02F 3/341* (2013.01);
(Continued)

(58) Field of Classification Search
CPC ........ C02F 3/1263; C02F 3/301; C02F 3/302; C02F 3/30; C02F 2303/16; C02F 3/305;
(Continued)

(56) References Cited

U.S. PATENT DOCUMENTS 4,026,802 A * 5/1977 Akae ...................... C02F 3/223
                                                                   210/151
2009/0139928 A1 * 6/2009 Rodgers, Jr ............ C02F 3/301
                                                                   210/610

(Continued)

OTHER PUBLICATIONS

International Search Report and Written Opinion dated Jul. 16, 2018, from PCT/AU2018/050406, 9 sheets.
(Continued)

*Primary Examiner* — Claire A Norris
(74) *Attorney, Agent, or Firm* — Katten Muchin Rosenman LLP

(57) ABSTRACT

A method for the treatment of water, the method comprising the steps of anaerobic uptake and storage of at least a portion of the organic components in the water by a heterotrophic denitrifying biomass absorption of ammonium ions with an ammonium ion absorbent; and aerobic oxidation of the absorbed ammonium by a nitrifying biomass comprising ammonium oxidizing microorganisms, wherein the step of aerobic oxidation of the absorbed ammonium is preceded by the step of exposing at least a portion of the nitrifying biomass to atmospheric oxygen.

26 Claims, 5 Drawing Sheets

(51) Int. Cl.
*C02F 3/34* (2006.01)
*C02F 3/00* (2006.01)

(52) U.S. Cl.
CPC .... *C02F 2003/001* (2013.01); *C02F 2303/16* (2013.01)

(58) Field of Classification Search
CPC .. C02F 1/286; C02F 1/42; C02F 3/303; C02F 1/586; C02F 2101/16; C02F 3/307
USPC .............................. 210/605, 617, 615, 630
See application file for complete search history.

(56) References Cited

U.S. PATENT DOCUMENTS

| 2009/0272688 | A1* | 11/2009 | Zaitsev ..................... C02F 3/08 210/614 |
| 2011/0062080 | A1* | 3/2011 | Galgon ................... C02F 3/305 210/631 |
| 2013/0240420 | A1* | 9/2013 | Robertson ............... C02F 3/303 210/96.1 |
| 2014/0319060 | A1* | 10/2014 | Wennergren .............. C02F 1/42 210/673 |
| 2015/0360983 | A1 | 12/2015 | Murkute et al. | |

OTHER PUBLICATIONS

International Preliminary Report on Patentability dated Nov. 5, 2019, from PCT/AU2018/050406, 6 sheets.

Flavigny, R.M.G., 'A novel aerobic process for carbon and nitrogen removal from wastewater using a biofilm with passive aeration', School of Engineering and Information Technology, Murdock University, Western Australia, Jun. 2015, PhD Thesis. See whole of document but particularly abstract; pp. 85-95, 106-107, 111-112, 117, 120-125, 133-134, 140-141; figure 5-1, 5-2, 5-5; table 2-1. Relevant to claim No. 1-37.

Guerrero, L. et al. 'Simultaneous nitrification-denitrification of wastewater: effect of zeolite as a support in sequential batch reactor with step-feed strategy', Int. J. Environ. Sci. Technol. (2016), vol. 13, p. 2325-2338. See whole document.

Jung, J-Y. et al. 'Enhanced ammonia nitrogen removal using consistent biological regeneration and ammonium exchange of zeolite in modified SBR process', Water Research (2004), vol. 38. p. 347-354. See whole of document.

Wei, D., et al. 'Enhanced aerobic granulation and nitrogen removal by the addition of zeolite powder in a sequencing batch reactor', Appl Microbiol Biotechnol (2013), vol. 97, p. 9235-9243. See whole of document.

Flavigny, R.M.G., et al. 'Organic carbon removal from wastewater by a PHA storing biofilm using direct atmospheric air contact as oxygen supply', Bioresource Technology (2015), vol. 187, p. 182-188. See whole of document.

* cited by examiner

WATER TREATMENT METHOD

CROSS REFERENCE TO RELATED APPLICATIONS

This application is the National Stage of International Application No. PCT/AU2018/050406, filed on May 3, 2018, which claims priority of Australian Patent Application No. 2017901640, filed on May 4, 2017, which are hereby incorporated herein by reference in its entirety.

TECHNICAL FIELD

A method for the treatment of water.

BACKGROUND ART

The following discussion of the background art is intended to facilitate an understanding of the present invention only. The discussion is not an acknowledgement or admission that any of the material referred to is or was part of the common general knowledge as at the priority date of the application.

Biological nitrogen removal (BNR) is an important part of water treatment and generally consists of two separate biological processes, nitrification and denitrification. These two processes have mutually exclusive requirements.

Nitrification is performed under aerobic conditions by slow-growing autotrophic nitrifying bacteria, using oxygen to convert ammonia to nitrite and then possibly but not necessarily to nitrate. In contrast, denitrification is performed by heterotrophic bacteria that require anaerobic conditions and a source of electrons, typically organic material (Biological Oxygen Demand, BOD) to convert nitrate into nitrogen gas. The electrons are usually provided in the form of oxidisable organic and inorganic compounds in the water.

Traditionally, biological water treatment is operated as anaerobic digestion or aerobic activated sludge. The first treatment removes organics (BOD) but not nitrogen. The second process requires very high energy supply for air-blowers which can be explained by the need to produce bubbles of which each literally lifts the whole water column above it (typically 5 m) by its own height. Additionally, without specifically controlling oxygen, the activated sludge treatment typically oxidises ammonia not only to nitrite but further to nitrate which subsequently requires a separate denitrification step in which often additional organic substances are necessary as electron donor.

The key energy and operation costs for oxygen supply to the biomass for ammonium oxidation and at least parts of organics (BOD) oxidation are in the above-described awkward step of oxygen transfer to the bulk solution. By enabling the biomass to form a film on a suitable carrier material (fixed bed or moving bed biofilm reactor) higher levels of biomass can be maintained but oxygen supply is still expensive via aerating the bulk solution. In trickling reactors or Rotating disc contactors biomass can be exposed to the air but the processes are not effective in terms of performance and/or energy requirements.

By relying on storage bacteria (glycogen accumulating organism or GAO, such as *Candidatus competibacter*) organic compounds (BOD) can be removed and stored by GAO biofilms as organic polymers such as PHA under anaerobic conditions (anaerobic phase) and after subsequent drainage of the solution (the air exposed GAO biofilm can oxidise PHA and regenerate its storage capacity (aerobic phase) for the next anaerobic phase. This process can remove BOD but not nitrogen from wastewater which makes the process incomplete.

In the context of the present specification, the term biomass shall be understood to include the terms sludge or biofilm as used in industrial settings. It is understood to include live active mixed populations of microorganisms.

SUMMARY OF INVENTION

In accordance with the present invention, there is provided a method for the treatment of water, the method comprising the steps of:
  anaerobic uptake and storage of at least a portion of the organic components in the water by a heterotrophic denitrifying biomass;
  absorption of ammonium ions with an ammonium ion absorbent; and
  aerobic oxidation of the absorbed ammonium by a nitrifying biomass comprising ammonium oxidising microorganisms,
wherein the step of aerobic oxidation of the absorbed ammonium is preceded by the step of exposing at least a portion of the nitrifying biomass to atmospheric oxygen.

Advantageously, the oxidation of the ammonium provides nitrite and/or nitrate ions which serve as the electron acceptors for denitrification with the absorbed or stored organics acting as electron donors.

It will be appreciated that at least a portion of the heterotrophic denitrifying biomass will be capable of denitrification.

It will be appreciated that at least a portion of the heterotrophic denitrifying biomass could also use oxygen such that stored BOD can be oxidised if there is insufficient nitrate/nitrite available.

It will be appreciated that the nitrate/nitrite formed is reduced by the heterotrophic denitrifying biomass resulting in net N removal via $N_2$ production. Without being limited by theory, it is believed that this denitrification may occur at the same time as nitrification, according to the known principle of simultaneous nitrification and denitrification (SND)

Typically, a component of the stored organics (e.g. in the form of PHA) is not only oxidised via denitrification but also by oxygen.

In one form of the invention, the heterotrophic denitrifying biomass and the nitrifying biomass are mixed to provide a mixed biomass.

Preferably, the heterotrophic denitrifying biomass is provided on a carrier.

Preferably, the nitrifying biomass is provided on a carrier.

In the water treatment method of the present invention, the heterotrophic denitrifying biomass and/or the nitrifying biomass or the mixed biomass is carried by a carrier, such as, for example, a biotower, a rotating biological contactor, rough stones, slats, plastic media, a reticulated foam particle, an arrangement of fibres, a microcarrier and/or media particles.

In one form of the invention, the ammonium ion absorbent is provided on a carrier. In a second form of the invention, the ammonium ion absorbent acts as the carrier for either or both of the heterotrophic denitrifying biomass and the nitrifying biomass. Furthermore, the ammonium ion absorbent can be incorporated into the biomass.

In one form of the invention, the step of exposing at least a portion of the nitrifying biomass to atmospheric oxygen comprises removing at least a portion of the water.

It will be appreciated that the heterotrophic denitrifying biomass and the ammonium ion absorbent may be on the same carrier or different carriers. Additionally, two or more of the heterotrophic denitrifying biomass, the ammonium ion absorbent and the nitrifying biomass may be on the same carrier. For example, the heterotrophic denitrifying biomass, the ammonium ion absorbent and the nitrifying biomass may be on the same carrier or the heterotrophic denitrifying biomass and the ammonium ion absorbent may be on a first carrier and the nitrifying biomass may be on a second carrier or the heterotrophic denitrifying biomass and the nitrifying biomass may be on a first carrier and the ammonium ion absorbent may be on a second carrier or the ammonium ion absorbent and the nitrifying biomass may be on a first carrier and the heterotrophic denitrifying biomass may be on a second carrier.

In one form of the invention, the step of exposing at least a portion of the nitrifying biomass bacteria to atmospheric oxygen comprises removing at least a portion of the water from the nitrifying biomass. In a second form of the invention, the step of exposing at least a portion of the nitrifying biomass bacteria to atmospheric oxygen comprises lifting at least a portion of the carrier with biomass above the water level. Exposing the nitrifying biomass to atmospheric oxygen may be accompanied by ventilated air.

Advantageously, during the step of aerobic treatment, oxygen oxidises the organic polymer (e.g. PHA resulting from BOD storage) on the carrier. Preferably, during the step of anaerobic treatment, at least a portion of the BOD is taken up as PHA.

Advantageously, the steps of anaerobic treatment followed by aerobic treatment enables effective removal of organic BOD by storage as PHA by glycogen accumulating organisms (GAO) with virtually no associated aeration costs as the biomass can take up oxygen directly from air, avoiding the supply of compressed air to solubilise oxygen in the bulk solution.

Without being limited by theory, it is believed that during the aerobic treatment phase, nitrification products such as nitrate and nitrite may intermittently accumulate but are denitrified using the stored PHA as the electron source.

By maintaining careful control over the oxygen environment, the oxidation of PHA can occur via denitrification using nitrite or nitrate as electron acceptor rather than via $O_2$. This means that nitrification and denitrification can occur simultaneously, termed herein, 'simultaneous nitrification and denitrification' or SND.

Advantageously, after the step of aerobic treatment, the storage capacity of the biomass to store more BOD and the absorbent to absorb more ammonia is regenerated.

Preferably, the method of the invention comprises repeating the steps of anaerobic treatment and aerobic treatment on the same water sample. Preferably, the steps of anaerobic treatment and aerobic treatment are repeated at least two times.

The heterotrophic denitrifying biomass is selected to denitrify water and convert organic matter in the water to polymeric storage products. Preferably, the heterotrophic denitrifying biomass removes organic carbon and potentially phosphate and some nitrogen from the water. Preferably, the heterotrophic denitrifying biomass contains denitrifying bacteria.

The heterotrophic denitrifying biomass converts carbon to polymeric storage products to act as an energy store to fuel conversion of nitrites and nitrates to gaseous nitrogen i.e. in the anaerobic conditions carbon is converted to polymeric storage products. These act as an energy store to fuel the conversion of nitrites and nitrates to nitrogen gas which occurs under these anaerobic conditions.

The two biomasses described can be completely intermixed on the same carrier with or without the ammonium absorbent, or they can be spatially separated by mm distances (separate colonies), or they can be specially separated by dm or m distances within the same reactor (e.g. top filling with the heterotrophic denitrifying biomass and bottom filling with the nitrifying biomass). Alternatively, the heterotrophic denitrifying biomass and the nitrifying biomass may be provided in separate reactors with a liquid exchange between the reactors enabling the link between aerobic nitrification and anaerobic denitrification.

The heterotrophic denitrifying biomass may be composed of any population of micro-organisms that are able to store BOD and perform denitrification of the wastewater being treated, i.e. the conversion of oxidised nitrogen to a gaseous end product. For example, the biomass may be composed of microbes such as bacteria, fungi and archaea. Preferably, the biomass is composed principally of bacteria. An example would be *Pseudomonas denitrificans* but many other species within the Pseudomonads and other genera may be employed in the reactor such as *Aquaspirillium, Agrobacteria, Chromobacteria, Neisseria, Bacilli* and *Thiobacilli*. The preferred bacteria are those that are capable of converting carbon into polymeric storage products and converting nitrate or nitrite into nitrogen gas such as denitrifying glycogen accumulating organisms (DGAOs), denitrifying polyphosphate accumulating organisms (DPAOs), etc.

Generally, there are three main types of storage compounds which are generated by bacteria during the conversion of organic matter into polymeric storage products. These are glycogen, polyphosphate and poly-hydroxyalkanoates (PHA) such as poly-hydroxybutryic acid (PHB). Preferably, the polymeric storage product is poly-hydroxybutryic acid or other PHA.

The nitrifying biomass is selected to nitrify the water. In one form of the invention, the nitrifying biomass can be enriched from activated sludge.

Alternatively, to the above or in addition thereto, the process of selective enrichment may be used to develop suitable microbes.

The nitrifying biomass may be composed of any population of micro-organisms that are able to convert ammonia to nitrite or directly to $N_2$ such as Anammox bacteria. For example, the biomass may be composed of microbes such as bacteria, fungi and archaea. Preferably, the biomass is composed principally of bacteria. Any microbe that is capable of nitrifying wastewater may be used. Preferably, the nitrifying biomass comprises bacteria of the genus *Nitrosomonas* and *Nitrospria*. In a highly preferred state of the invention, the reactor would preferably support only the Nitrosomonads so that there is a saving in both oxygen and BOD due to nitrite rather than nitrate being the principle chemical shared between the two biomasses.

Preferably, the heterotrophic denitrifying biomass and/or the nitrifying biomass are provided as biofilms. Advantageously, biofilm based reactors may increase the biomass concentration compared to a similar sized suspended culture reactor and can have lower footprint requirements.

In one form of the invention, the ammonium ion absorbent is an ion exchange resin. Examples of suitable ion exchange resins are zeolite, clinoptilolite, phillipsite, and mordenite or other natural or synthetic ion exchange materials.

The ammonium ion absorbent may be permanently or semi-permanently attached to the carrier. Alternatively, the ammonium ion absorbent, for example in the form of a powder, fibre or other form may be integrated into the heterotrophic denitrifying biomass and/or the nitrifying biomass or the mixed biomass. Alternatively, the ammonium ion absorbent may be the carrier itself when provided in a useful form that offers sufficient surface area and voids for drainage and air supply.

In one embodiment of the present invention, the ammonium ion absorbent is inoculated with the heterotrophic denitrifying biomass.

It will be appreciated that ammonium ions in the water may be absorbed by the ion exchange resin or within the heterotrophic denitrifying or nitrifying biomass.

In one embodiment of the invention, the water is wastewater. The term "wastewater" as used herein refers to a mixture of water and dissolved or suspended solids. It is generally water derived from residential, business or industrial sources, which may contain a variety of waste products such as soap, carbohydrates, lipids, proteins, ammonia, chemicals or manure. It may be derived from a wide variety of sources, for example effluent from agricultural sources such as animal farming practices including piggeries, aquaculture sources, poultry farms and dairy farms. Industrial wastewater and effluent from sources such as paper and pulp mills, sugar refineries, abattoirs, food processing and manufacturing industries, effluent from the tanning industry, the defence industry (e.g. munitions production), the food industry, the agriculture industry, the chemical industry (e.g. manufacturing of fertilisers) and mining may be treated using the present method. Effluent from human sources such as sewerage facilities, communal wastewater, and domestic grey, yellow and black water is also included within the meaning of the term. Storm water, surface water, and groundwater infiltration, particularly if it is contaminated by organic, nitrogen containing or chemical substances, may also fall within the meaning of the term wastewater. Preferably, the wastewater to be treated using the method of the present invention is wastewater derived from a municipal wastewater treatment facility, such as sewage. It is contemplated that the methods of the present invention are suitable for removal of nitrogenous matter, carbonaceous matter, phosphorous and/or mixtures thereof from aqueous waste generated by, for example, domestic, agricultural, mining or industrial processes. Wastewater can also include natural or modified water bodies such as aquifers, lakes, ponds, pools, lagoons, rivers or run-offs and leachates from material that is in contact with water, as long as it contains ammonia, or other nitrogen substances and organic compounds.

It will be appreciated that the treatment durations of the anaerobic and aerobic steps can vary depending on the type or concentration of wastewater used, environmental conditions such as temperature and salt content and the amount of biomass that has built up. Typically for domestic wastewater with around 500-2000 mg BOD and 30 to 200 mg/L of nitrogen the treatment duration of the anaerobic step is between 3 to 12 hours, and the treatment duration of the aerobic step is between 1 and 12 hours.

The method of the present invention can be modified and adapted by changing the amount and type of either or both carriers, where used, the ammonium ion absorbent, the duration of the anaerobic and aerobic steps, repeating the anaerobic and aerobic steps for the same batch of water (double treatment), or subsequent treatment using two or more reactors. The use of several subsequently operated reactors can involve reactors that carry out BOD storage (plain carrier as support material) and N storage (presence of absorbent) separately, resulting in different biomass compositions with BOD storing bacteria (GAO, denitrifyers, heterotrophic bacteria) predominating in the first reactor and nitrogen metabolizing bacteria (ammonium oxidisers, nitrifiers, Anammox bacteria) predominating in the second reactor. Alternatively, subsequent operation can make use of the same reactor type (BOD and N removal) using carrier and absorbent in each reactor, possibly in different ratios and with different control regimes.

In accordance with the present invention, there is provided an apparatus for the treatment of water, the apparatus comprising at least one reactor comprising a heterotrophic denitrifying biomass on a carrier and a nitrifying biomass on a carrier and an ammonium ion absorbent.

In one form of the invention, the heterotrophic denitrifying biomass and the nitrifying biomass are provided on the same carrier. In an alternate form of the invention, the heterotrophic denitrifying biomass and the nitrifying biomass are provided on different carriers. Where the heterotrophic denitrifying biomass and the nitrifying biomass are provided on different carriers, they may be provided in different reactors.

In one form of the invention, the ammonium ion absorbent is provided on a carrier. The ammonium ion absorbent may be provided on the same carrier as either or both of the heterotrophic denitrifying biomass and the nitrifying biomass.

In one form of the invention, the ammonium ion absorbent is a carrier.

In one form of the invention, there is provided one reactor.

In an alternate form of the invention, there is provided two reactors, wherein the first reactor comprises the heterotrophic denitrifying biomass and the second reactor comprises the nitrifying biomass. Preferably, the ammonium absorbent is provided in the second reactor.

There may be provided a plurality of reactors adapted to perform the steps of anaerobic treatment and aerobic treatment.

The use of several subsequently operated reactors can involve reactors that carry out BOD storage (plain carrier as support material) and N storage (presence of absorbent) separately, resulting in different biomass compositions with BOD storing bacteria (GAO, denitrifyers, heterotrophic bacteria) predominating in the first reactor and nitrogen metabolizing bacteria (ammonium oxidisers, nitrifiers, Anammox bacteria, nitritifiers) predominating in the second reactor.

The ion changer inoculated with nitrifying bacteria is added in the second reactor before the supply of the aqueous solution or mixed with the first biomass and added in the first reactor before the supply of the aqueous solution.

A substantially anoxic or anaerobic state may be achieved by maintaining the first reactor in a liquid locked state, i.e. filling the first reactor entirely with wastewater such that substantially all atmospheric oxygen is excluded. However, other methods known to the skilled person of reducing or eliminating oxygen from the reactor are contemplated.

During the storage of acetate phase, the first reactor in the method of the present invention is preferably maintained in a substantially anoxic or anaerobic state during the first time period, to allow the biomass to convert carbon in the wastewater to polymeric storage products rather than oxidising it. Reference to "substantially anoxic or anaerobic" does not mean that the entry of oxygen must be completely avoided. Some oxygen entry, for example during drainage of a submersed biofilm or from the incoming wastewater, can be tolerated. Preferably, during continuous operation the dissolved oxygen levels in the first reactor are less than about 1 mg/L, more preferably less than about 0.1 mg/L and most preferably it cannot be detected with traditional oxygen electrodes as any inadvertent or deliberate (not normally) oxygen is consumed.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which.

DESCRIPTION OF EMBODIMENTS

Figure 1:
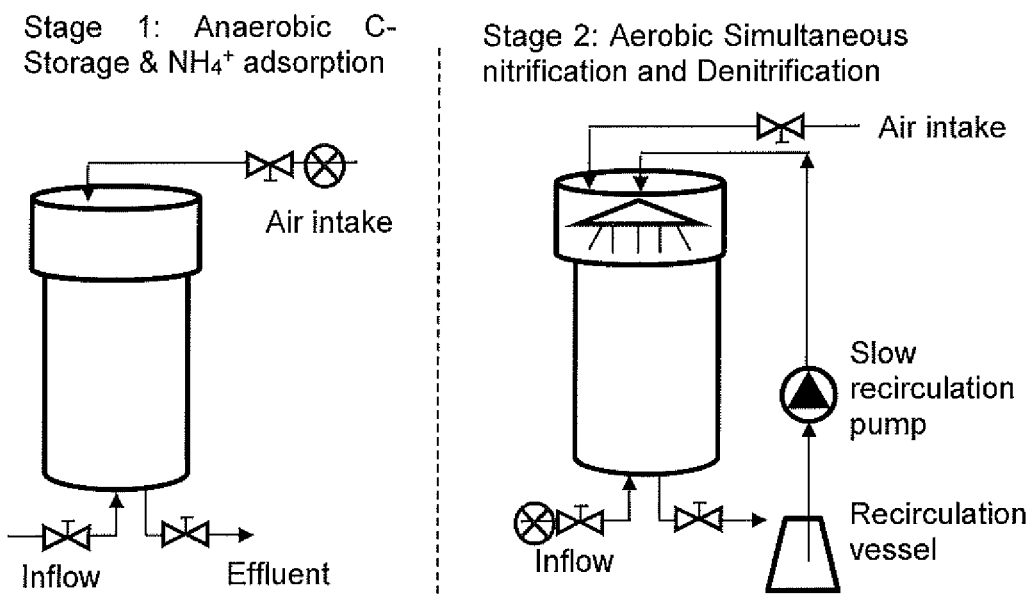
FIG. 1 is a schematic representation of a single reactor in operation.

Throughout this specification, unless the context requires otherwise, the word "comprise" or variations such as "comprises" or "comprising", will be understood to imply the inclusion of a stated integer or group of integers but not the exclusion of any other integer or group of integers.

The novel component of including the presence of added ammonium- (and potentially phosphate-) absorbent (such as zeolite) enables in addition to BOD uptake, ammonium (and other nitrogen species and potentially phosphate) uptake by merely submersing (or flooding) the biofilm in wastewater during a submersed (anaerobic) phase. After an adequate time of exposure (potentially but not necessarily under mixing or water recycle or some form of minimizing diffusion limitation) the wastewater is drained, leaving the biofilm and the absorbent exposed to air. By direct oxygen uptake from the air, the biofilm can oxidise the PHA (or other organics resulting from absorption during the submersed phase, including suspended solids) and oxidise ammonium (from within the biofilm and/or from the absorbent). Nitrification products such as nitrate or nitrite may intermittently accumulate but are aimed to be denitrified using the stored PHA as electron source. The air space can, if desired be replenished by introducing more air or oxygen. The air replacement enables control on overall oxygen limitation of the process. By maintaining suitable oxygen limitation, the oxidation of PHA via denitrification instead of via oxygen can be promoted such that nitrification and denitrification occur simultaneously. Further, oxygen control is used to promote the growth of Anammox bacteria which oxidise ammonia with nitrite produced from incomplete nitrification (nitritification). After the drained (aerobic) phase, characterized by oxygen supply from the gas to biofilm is completed, the storage capacity of bacteria to store new BOD and of the absorbent to absorb new ammonia is regenerated such that a renewed submersed phase can be started. Repeated sequences of the two phases enable BOD and nitrogen removal by avoiding energy expensive oxygen transfer to the bulk wastewater solution.

The bacteria employed in the process of the present invention, need not be specifically added from defined bacterial cultures and the process of selective enrichment may be used. Selective enrichment provides conditions under which target microbes with specific capabilities are encouraged to develop by providing conditions that favour their growth and or discourages the growth of non-target organisms. In the present case, target organisms are:

storage bacteria such as GAO, PAO or others that can store soluble BOD under anaerobic conditions and can denitrify nitrite or nitrate;

ammonium oxidising bacteria that can form a biofilm (AOB) such as *Nitrosomonas;*

Anammox bacteria that oxidise absorbed ammonium using nitrite as electron donor resulting in nitrite as well as ammonium conversion to $N_2$; and Protozoa that "graze on bacterial biofilms" and live in extremely high numbers in the described anaerobic submersed and aerobic drained biofilm. Preferentially protozoa that keep the biomass level of the biofilm controlled by oxidising bacteria biomass by using oxygen directly from the air.

For selective enrichment, a suitable mixture of starting inoculum, known to contain some ammonium oxidising bacteria and storage bacteria is used. A typical example is an activated sludge sample from a wastewater treatment plant. The sample is mixed with a suitable wastewater (for example 50/50 with synthetic wastewater containing acetate as soluble BOD and ammonia). The biomass of this mix of sample/wastewater is encouraged to form a biofilm by being repeatedly percolated over the carrier material with which a reactor is filled. The reactor could be for example a cylinder with top and bottom openings and with a height being four times greater than its diameter. Percolation can for example be carried out by means of a peristaltic pump which continuously or intermittently pumps the liquid that has trickled from the bottom of the cylinder into a collection vessel, back to the top of the cylinder. For example, a recirculation speed resulting in a liquid turnover every 2-20 min can be used. When the recirculated liquid becomes clearer and the carrier material shows signs of biofilm development the development of biofilm can be stopped or furthered by adding more activated sludge or wastewater.

After a suitable level of biofilm has developed, selective conditions are applied to encourage the growth of storage bacteria. The biofilm on a carrier material is exposed to selective conditions that include alternating sequences of anaerobic flooding of the biofilm and aerobic exposure to air such that principally bacteria capably of storage will develop while other bacteria will diminish in numbers. The process of selective enrichment of storage bacteria is described in more detail below:

i. The biofilm is submersed with suitably filtered or synthetic wastewater such that the biomass is exposed to the soluble organic feed (BOD, such as acetate) in the absence of oxygen for 1-6 hours.

ii. After draining the liquid, the biomass attached to the provided carrier material is exposed to air by for 1-6 hr. This allows the growth specifically of those bacteria that could store BOD during the anaerobic submersed phase, while other bacteria are disfavoured and tend to be diluted out.

iii. The above sequence is repeated sufficiently long that the anaerobic uptake of BOD (for example between 200 and 100 mg/L) can be observed. This can take for example six weeks or 30 repeated cycles.

iv. Typically a successful storage biofilm could represent (2-20 g of dry biomass per L of total reactor volume, 5-30% of the volume could be taken by the carrier, 1-15% by the ammonium absorbent and 1-15% by biomass.

As soon as successful selective enrichment of storage bacteria is achieved and before too much of the originally present ammonium oxidising bacteria (AOB) are being lost from the biofilm, a zeolite powder (for example a grain size of 2 to 8000 µm can be used) suspension is made (with about 2-200 g/L) and is circulated over the biofilm rich in storage bacteria (with a flowrate, resulting in retention times for example between 0.1 and 100 hr). It is intended that a flow is reached that will distribute the zeolite powder uniformly over the biomass. This can be aided by changing the flow direction, moving the biomass carriers, controlling the flow rate and concentration of zeolite used, feeding in zeolite suspension over the longer term.

After sufficient zeolite is added to the biofilm such that adequate amounts of ammonia can be absorbed, Ammonium oxidising nitrifying bacteria (AOB) need to be selectively enriched to contribute to the biofilm's ultimate capability for the Open Air Simultaneous Nitrification and Denitrification Fixed Film Reactor (Open Air SND-FFR) also termed Passive Aeration Simultaneous Nitrification and Denitrification (PASND). This is done by first mixing a second inoculum of activated sludge samples (for example 10-800 L/m$^3$ of reactor) with an ammonium containing solution (wastewater or for example 3 mM ammonium solution) and percolating this over the above storage biofilm. After for example 5 kg of biomass from the sludge is absorbed per m$^3$ of reactor volume the addition of further activated sludge biomass can be stopped. As an alternative to activated sludge addition to build AOB active biomass the following additions can be used:

i. Highly active AOB biomass from reactors or supplies;
ii. Biomass from Anammox, Canon or other processes in which ammonium oxidising bacteria are numerous;
iii. Compost extracts, soil extracts, extracts from aquaculture ammonia filters, and similar sources;
iv. No further addition and allowing sufficient time for growth of residual AOB from the first biofilm addition (prior to zeolite addition).

The successful placement of the three ingredients on the carrier material (AOB, storage bacteria, zeolite) is indicated by reasonably definable performance of the system. This could be for example by:

Uptake of 10 mM acetate (or other BOD);
Production of PHA inside the biomass; or
Removal of 2 mM ammonium from the bulk liquid into the zeolite coated biofilm, during anaerobic exposure of the biofilm to wastewater within a time of 3 hr and demonstrating:

Adequate or most of the ammonium disappearance from solution and hence from the zeolite in the subsequent aerobic phase;
Decreasing PHA levels in the biomass;
Production of glycogen of the biomass.

Example species of the bacteria that can be part of the biofilm are:

Denitrifying bacteria, GAO (e.g. *Candidatus competibacter*, denitrifying GAO or PAO or other storage bacteria);
Ammonium oxidising bacteria AOB (e.g. *Nitrosomonas*).

Alternative ways of zeolite containing biofilm development on the carrier:

i. Instead of adding zeolite powder, zeolite can be used as the carrier material;
ii. Instead of adding zeolite powder, a carrier material that has zeolite or other ion exchange material imbedded or coated can be used;
iii. A soluble ion exchange material could be precipitated on the carrier or biofilm;
iv. Instead of zeolite other material that can absorb ammonia can be used.

In the case of a double reactor set-up, the enrichment of storage bacteria will be carried out on the carrier for reactor one and the placement of AOB bacteria together with zeolite will be carried out for reactor two.

Biofilm reactors are generally divided into fixed bed reactors and fluidized bed reactors. Moving bed reactors represent a hybrid. All these could be used for the current invention. There are a number of types of fixed bed processes which utilize solid supports, i.e., trickling filter, biotower and rotating biological contactor (RBC). In such settings, micro-organisms attach and live on the medium and take up the nutrients and other compounds from the wastewater flow passing by them. A trickling filter is a bed of coarse material (e.g., stones, slats and plastic media) that wastewater is passed through. Biotowers are also trickling filters, but in the shapes of high towers. An RBC uses flat disks, ranging in diameter from 2 to 4 m and up to 1 cm in thickness, as the solid support to attach micro-organisms. The disks are mounted on a common shaft that rotates at approximately 1 to 2 rpm. Trickling filters and biotowers are typical fixed-biofilm reactors, while a RBC is treated as a special adaptation of the attached-growth process.

A biological fluidized-bed (BFB) reactor is similar to the fixed bed reactors described above in also being a biofilm reactor. However, the difference between the fixed bed reactor and the fluidized-bed reactor is that the biofilm media of the latter are not fixed but fluidized by suitable liquid flow. The advantages of a fluidized-bed reactor over suspended-growth and attached-growth reactors include: high biomass concentrations and surface areas, less susceptibility to sudden changes in load or temperature, successful carbon and nitrogen removal from municipal wastewater, the elimination of any problems and costs caused by sludge, and less expense based on savings in reactor space and rapid treatment time. A fluidized-bed reactor is generally more efficient than a packed-column (attached-growth) reactor in terms of nitrate removal of per unit reactor volume.

The media of a BFB reactor is usually light weight and has a particle size of 0.2 to 1.0 mm. At the beginning of operating a BFB reactor, the particles are expanded in a column by an upward flow of wastewater recirculation to the point at which the upward force is equal to the downward gravity. However, as the bacteria grow as a biofilm around the particle, increasing biofilm volume will continue to expand the bed. Therefore, at the steady state, where cell growth equals the rate the cells are washed off by the surface sheer, the bed may be at an undesirable height. As a result, to remove the excess biomass, particles should be taken out of the reactor and washed routinely.

A preferred embodiment of the method of the invention is characterized by the ammonium selective ion exchange resin being inoculated with nitrifying bacteria containing biomass such as activated sludge. The ion exchange resin inoculated with nitrifying bacteria is packed in the second reactor before the supply of the aqueous solution or mixed with the first biomass and packed in the first reactor before the supply of the aqueous solution.

The prior art porous carrier material of ion exchanger may be used for removal of nitrogen (ammonium) from wastewater as well as carrier materials for nitrifying bacteria biofilm formation. When an ammonium selective ion exchanger is used, under anoxic conditions the ammonium molecules passing across the biofilm were absorbed onto the ion exchangers in an extremely high rate. Under aerobic conditions, the absorbed ammonium molecules are continuously released from the ion exchanger and consumed by the coated nitrifying bacteria. The ammonium concentration in the nitrifying bacteria layer is less influenced due to the continuous replacement of ammonium molecules by the desorbed ammonium molecules from the ion exchangers. This may enhance a nitrifying bacteria film development as a continuous supply of food source for nitrifying bacteria may be achieved.

A preferred embodiment of the method of the invention is characterized in that the BOD storage biomass is inoculated on an inert carrier material. The carrier material inoculated with BOD storage bacteria was packed by itself, or was mixed with the ion exchanger carrier material inoculated with denitrify bacteria and packed together, in the first reactor to convert organic matter to polymeric storage products and convert nitrate/nitrate into gaseous nitrogen.

The BOD storage biofilm with the capability of denitrification is developed on inert supporting materials under alternating anoxic and oxic conditions. The use of the anaerobic storage of soluble carbon for removing BOD compounds without the costly transfer of oxygen into the bulk wastewater. During the anaerobic phase the BOD storage biofilm takes up the organic matter and stored as polymeric storage products. After the supply of the liquid containing nitrate/nitrite to the BOD storage biofilm, this organic matters stored as polymeric storage products is biologically oxidised, using nitrate/nitrite directly from the liquid and denitrifying the liquid.

By coating the nitrifying bacteria and its carrier onto the BOD storage bacterial biofilm, a novel biological nutrient removal system is developed. Thanks to the ammonium ion exchanger materials and BOD storage bacteria, this novel system can achieve a simultaneous ammonium and BOD removal under anaerobic conditions. Under anaerobic conditions, the ammonium molecules and dissolved BOD pass across the outer layer of denitrifying bacteria and are absorbed by the ammonium ion exchanger material and the BOD storage bacteria, respectively. It is well known that the growth rate of nitrifying bacteria is lower than that of heterotrophic bacteria (i.e. denitrifying bacteria). However, due to the limited DO the oxidation of BOD is minimized as well as the growth of heterotrophic bacteria, which is beneficial to the maintenance of a high proportion of nitrifying bacteria in the system. A high number of nitrifying bacteria could result in a fast overall treatment process.

After the BOD and ammonium is removed from an aqueous solution under anaerobic conditions by BOD storage bacteria and ammonium selective ion exchanger, the solution (i.e. wastewater) is literally treated already. The major fraction of the liquid can be drained out of the reactor and the remained liquid will be circulated between two reactors (if two reactors are applied) or within one reactor (if only one reactor is applied).

In one embodiment of the present invention, the method follows the following process steps:
  i. introducing the water into a first reactor comprising a first biomass and a first carrier material;
  ii. allowing the water to remain in the first reactor for a first period of time;
  iii. allowing the water from step (ii) to flow into a second reactor comprising a second biomass and a second carrier material comprising an ammonium selective ion exchanger;
  iv. allowing the liquid to remain in the second reactor for a second period of time;
  v. removing a fraction of the liquid from the second reactor;
  vi. allowing the remaining liquid from step (v) to circulate from the second reactor into the first reactor and from the first reactor into the second reactor in a continuous flow;
  vii. removing the liquid from the first reactor and/or the second reactor after a third period of time; and
  viii. Restarting at step (i).

In a second embodiment of the present invention, the method follows the following process steps:
  i. introducing the liquid into a biofilm reactor comprising a first biomass and a second biomass, a first carrier material, and material comprising an ammonium selective ion exchanger;
  ii. allowing the liquid to remain in the first reactor for a first period of time under oxygen free conditions;
  iii. draining all the liquid from the reactor and keeping the wet biofilm exposed to air which now fills the voids; alternatively removing only a fraction of the liquid from the reactor and circulating by downward trickling the remaining liquid in the reactor;
  iv. keeping the drained biomass exposed to air either with or without circulation of residual liquid for a second period of time;
  v. if necessary (depending on option taken in step iii) draining the circulated liquid from the reactor. The next wastewater treatment can be done after the second period of time; and
  vi. Restarting at step (i)

When the two reactors are used, the second reactor may be designed as a trickling reactor where the remained liquid trickles from the top of reactor with an attempt to introduce oxygen to trigger nitrification. The first reactor is designed as a traditional upflow reactor to diminish the introduction of oxygen. In the second reactor, the absorbed ammonium ions are desorbed and biologically oxidised, using the oxygen directly from the atmosphere, into nitrite/nitrate, resulting in a decrease in pH. The nitrified liquid then flows into the first reactor. In the first reactor, the nitrite/nitrate ions in the liquid is biologically denitrified, using the stored polymeric organic matters as electron donors, into gaseous nitrogen, resulting in an increase in pH. The circulation between the two reactors allows maintenance of pH at a level where both nitrification and denitrification work continuously. The continuously simultaneous nitrification and denitrification allows regeneration of the ammonium selective ion changer and the storage capability of storage bacteria to be capable of removing BOD and nitrogen from next batch of wastewater.

In another preferred embodiment of the invention, the two biomasses, carrier materials and ion exchange material are combined and packed in one reactor. The reactor is firstly operated in an upflow mode in order to remove BOD and ammonium from the wastewater, followed by a trickling mode to stimulate a simultaneous nitrification and denitrification.

Example 1

An aqueous solution containing from 42 mg nitrogen per liter in the form of ammonium as ammonium chloride and 192 mg organic carbon per liter in the form of sodium acetate was purified using the method of the invention.

Plastic biofilm carrier material (the carrier material has the form of "spoked wheels" a cylindrical shape with 7 mm height and 11 mm diameter, and a specific surface area for biofilm growth and support is 500 $m^2/m^3$) were packed in a tubular container with an inner diameter of about 60 mm and a height of 75 mm. The fixed bed reactor had a bed volume of about 250 mL and a void volume of about 100 mL. The packing materials was used as carrier materials for the BOD storage biomass biofilm formation. Once the BOD storage biomass biofilm was established (as evidenced by its capability to take up BOD and store as PHA under anaerobic conditions), powdered ammonium absorbent (e.g. zeolite) with a grain size of <0.3 mm was coated on the surface of BOD storage biofilm to form a zeolite coating layer. The zeolite coating layer was used as carrier material for ammonium oxdising biomass biofilm formation. 2 L of ammonium oxdising bacteria (AOB) with $OD_{600}$ value of 1.2 was continuously flushed through the tubular column for 12 hours until the $OD_{600}$ value of the AOB culture decreased to about 0.1, indicating more than 90% of AOB was attached to the zeolite layer. The dry weight ratio of BOD storage biomass (heterotrophic denitrifying biomass) to AOB to zeolite was about 3.5:10:1. The temperature of the reactor was kept at around 25° C. at all times and the pH value of the reactor was monitored.

Figure 2:
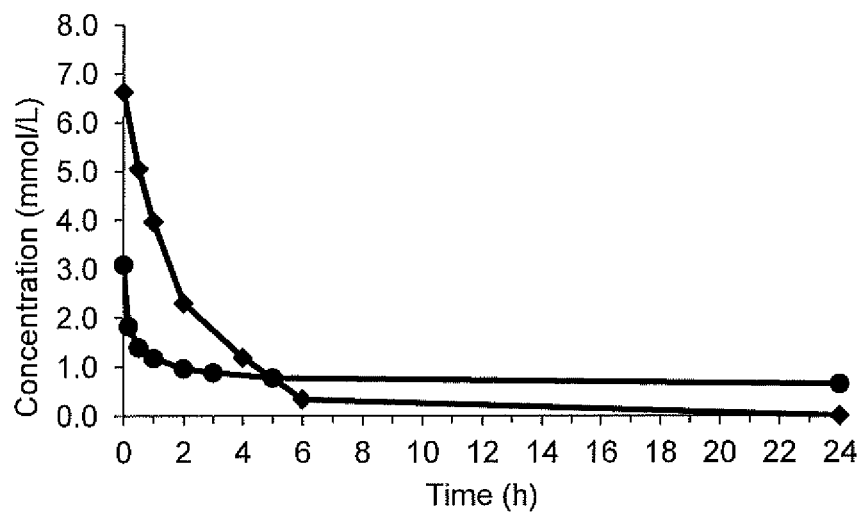
FIG. 2. Time course of the anaerobic BOD (here acetate) (♦) and ammonium (●) removal from three times void volume of wastewater.
Figure 3:
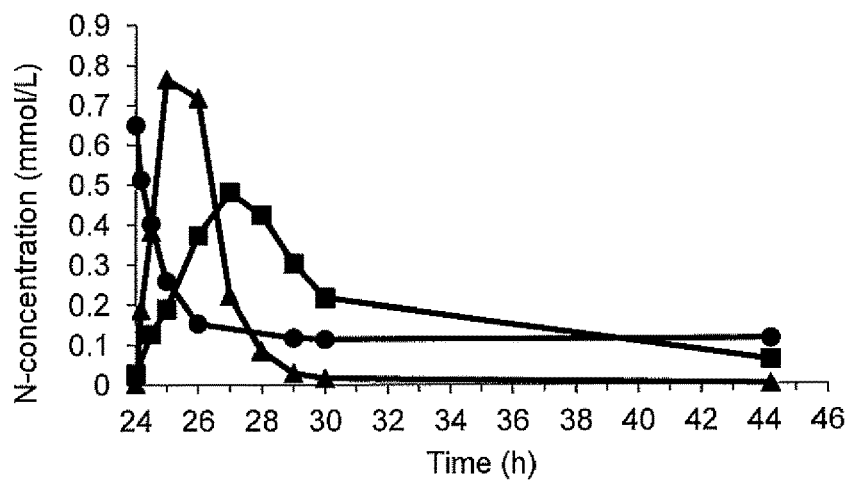
FIG. 3. Time course of the aerobic phase. The ammonium (●) was less than the cumulative nitrite (▲) and nitrate (■) after 2 hours.

Synthetic wastewater containing 192 mg/L organic carbon and 42 mg/L ammonium was used to simulate real municipal wastewater. The operation of wastewater treatment was carried out in two stages. At stage one, a load of synthetic wastewater (350 mL) was up-flushed into the reactor and the biofilm was given 24 hr under anaerobic conditions to remove organic carbon by biologically carbon storage as polymeric storage products and remove ammonium by zeolite adsorption (Stage 1 of FIG. 1). During this anaerobic phase, 100% organic carbon removal and more than 80% ammonium removal were achieved (FIG. 2). At stage two, a large fraction of the liquid (85%) was drained out to enable oxygen supply to the biomass and the remaining liquid (15%, 50 mL) was recirculated from the bottom to the top of the reactor for 24 hr (Stage 2 of FIG. 1) to enable uniform sampling during the aerobic phase. The introduction of oxygen through the porous packing material via passive aeration allowed nitrification of ammonium, which was converted into nitrite and nitrate (FIG. 3). The total accumulative nitrate and nitrite was larger than the total ammonium in the remaining liquid, suggesting that ammonium absorbed by zeolite was also nitrified. At later stage of stage two, the accumulative nitrate and nitrite decreased dramatically, indicating denitrification occurred.

Example 2

Figure 4:
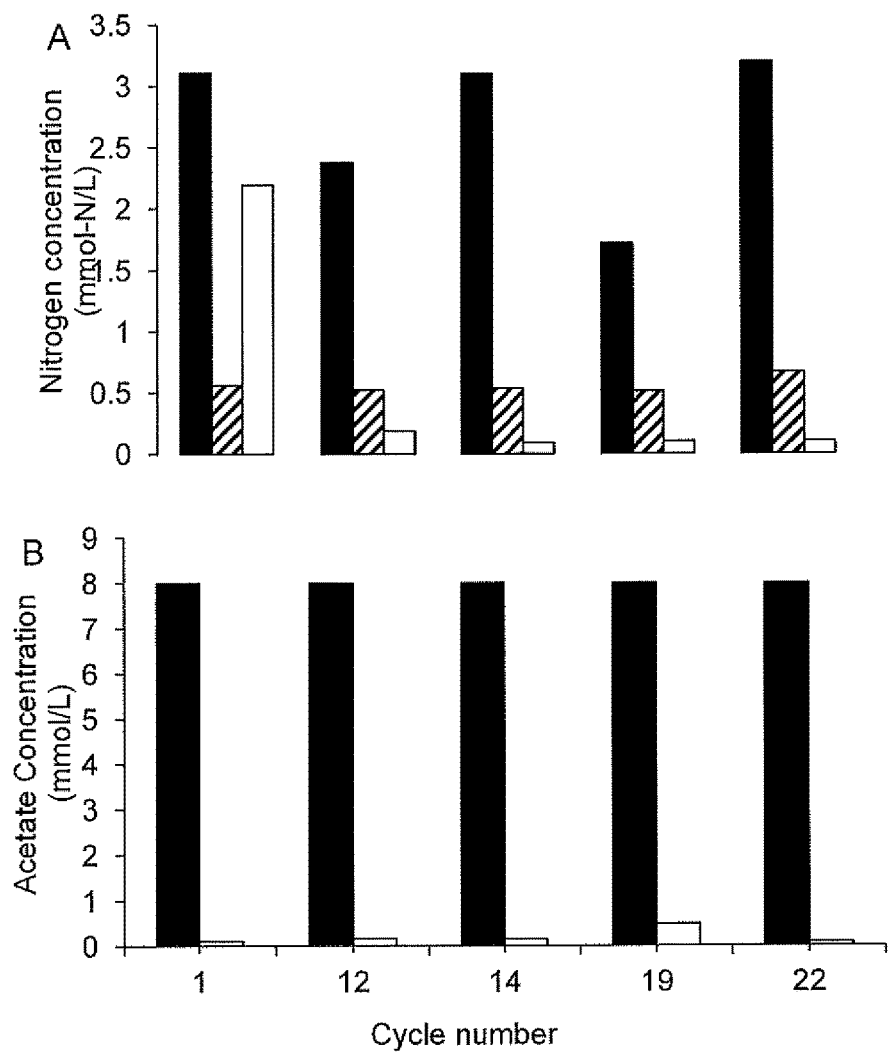
FIG. 4: A. Total nitrogen in the inflow at stage 1 (solid), at the outflow of stage 1 (hatching) and in the outflow of stage 2 (white). B. Stage 1 for carbon storage, 8 mmol/L acetate inflow (solid) and 99% acetate removal in the outflow (white)

Utilising the same bioreactor and synthetic wastewater as used in Example 1, the synthesised biofilm of comprised of BOD storage bacteria, ammonium oxidising bacteria and zeolite achieved acetate and ammonium removal through simultaneous nitrification and denitrification without requiring oxygen to transfer to the bulk liquid. Instead the oxygen was passive vented through the porous packing materials. The long-term stability of this system was tested over 21 cycles (6 weeks) of anaerobic phase (24 hr) and aerobic phase (24 hr). Over the 21 cycles, the ammonium was consistently removed to 82% in stage one, while in stage one, 0.1 mmol/L nitrate concentration remained (FIG. 4). In stage one, the carbon was continuously stored to 99% (FIG. 4). The result demonstrates that the synthesised biofilm could sustain carbon and ammonium removal without direct oxygen supply to the bulk solution.

Example 3

Utilising the same bioreactor and synthetic wastewater as used in Example 1, the wastewater treatment process was carried out in two stages. At stage one, a load of synthetic wastewater (350 mL) was up-flushed into the reactor and the biofilm was given 24 hr anaerobic conditions to remove organic carbon and ammonium (Stage 1). At stage two, 100% of the introduced liquid was drained out under gravity. The top of the tubular container was open to enable oxygen to passively vent through the porous packing materials. The second stage lasted for 24 hrs and no liquid circulation was applied. Repeated cycle of stage 1 and stage 2 was carried out. In Stage 2, the liquid in the reactor was drained and air drawn in the pore space of the packing materials. The biofilm coated on the packing materials (carrier) exposed to air due to the gas diffusion.

Figure 5:
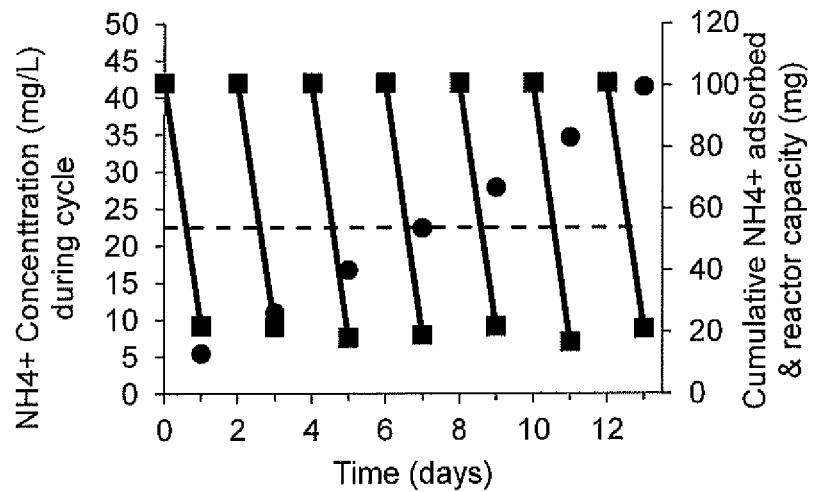
FIG. 5: Time course of the ammonium removal in the reactor without liquid recirculation. $NH_4^+$ concentration in individual cycles (■). Cumulative ammonium added to the reactor (●) and the zeolite reactor capacity (- -)

Seven cycles with no liquid circulation at the stage 2 were operated subsequently, and the cumulative ammonium added to the reactor was compared to the total capacity of the zeolite in the reactor. The cumulative ammonium loaded (100 mg-N or 7.1 mmol-N) to the reactor was about twice more than total theoretical adsorption capacity of the zeolite (54 mg-N or 3.8 mmol-N) (FIG. 5), indicating the zeolite was biologically regenerated for repeated ammonium absorption. The fact that the ammonium was continuously loaded to the reactor and no ammonium was released in the effluent, indicating that at stage 2, simultaneous nitrification and denitrification occurred without requiring liquid circulation.

Example 4

Utilising the same bioreactor and synthetic wastewater as used in Example 1, the wastewater treatment process was operated at an alternative manner. The operation of wastewater treatment was carried at two stages. At the stage one, a load of synthetic wastewater (100 mL) was up-flushed into the reactor and the biofilm was given 1 hr anaerobic conditions to remove organic carbon and ammonium (Stage 1).

At stage two, 100% of the introduced liquid was drained out under gravity. The top of the tubular container was open to enable oxygen to passively vent through the porous packing materials. The stage two lasted for 4 hr and no liquid circulation was applied. Repeated cycle of stage 1 and stage 2 was carried out. In Stage 2, the liquid in the reactor was drained and drawn air in the pore space of the packing materials. The biofilm coated on the packing materials (carrier) exposed to air due to the gas diffusion.

Figure 6:
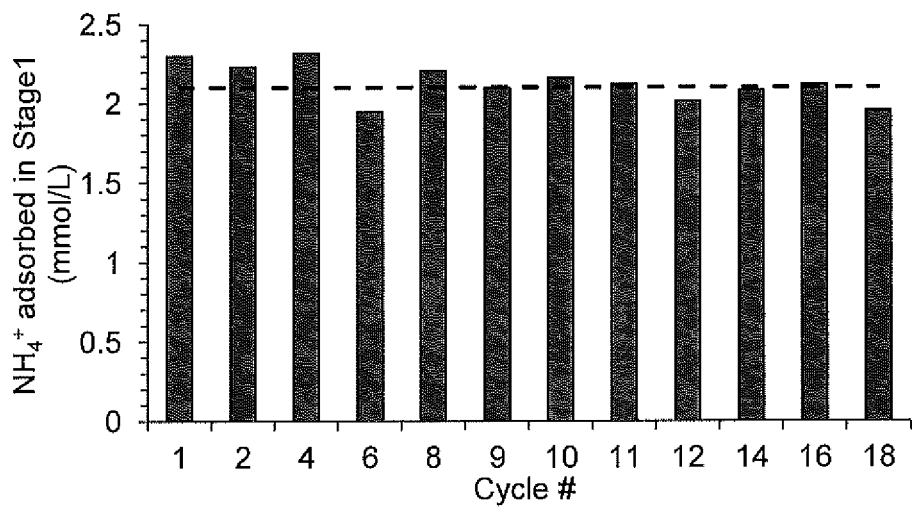
FIG. 6: Sustained ammonium removal by the zeolite amended biofilm reactor with a treatment time of 5 hr, consists of one-hour stage one and 4-hour stage two. The dashed line represents the average ammonium removal (2.1 mmol/L) over the cycles measured (12). With the ammonium feed concentration being 3.0 mmol/L this corresponds to 73% ammonium removal from the influent.
Figure 7:
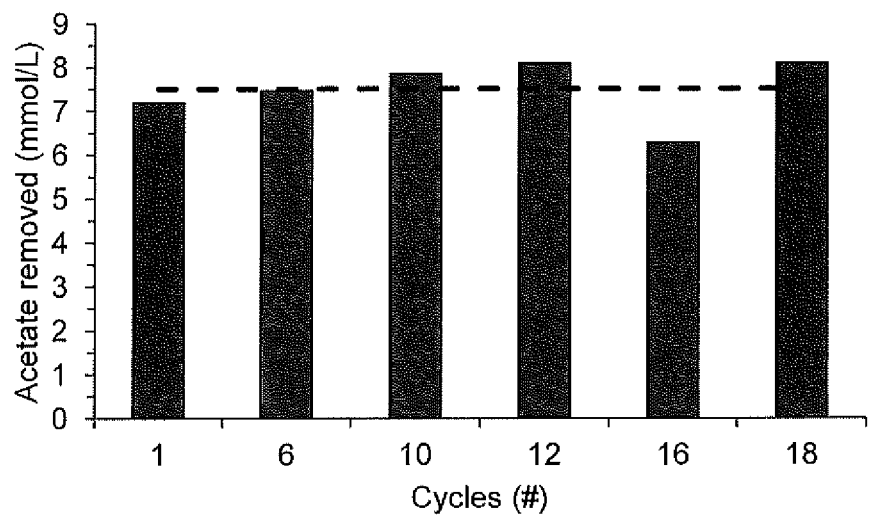
FIG. 7: Removal of BOD (here acetate) in the reactor after one hour of anaerobic Stage 1 phase. The average acetate removed was 7.5 mmol/L (dashed line)

The reactor was monitored for ammonium and acetate removal for 18 cycles. On average, 2.1 mmol/L of the ammonium in the inflow was removed (FIG. 6). This represented an ammonium removal efficiency of 73%. This ammonium removal was sustained over 18 cycles of operation. Dissolved carbon was removed sustainably in the Stage 1 within the one-hour retention time. The biological acetate removal in the Stage 1 was on average 7.5 mmol/L (>80% efficiency) (FIG. 7).

Figure 8:
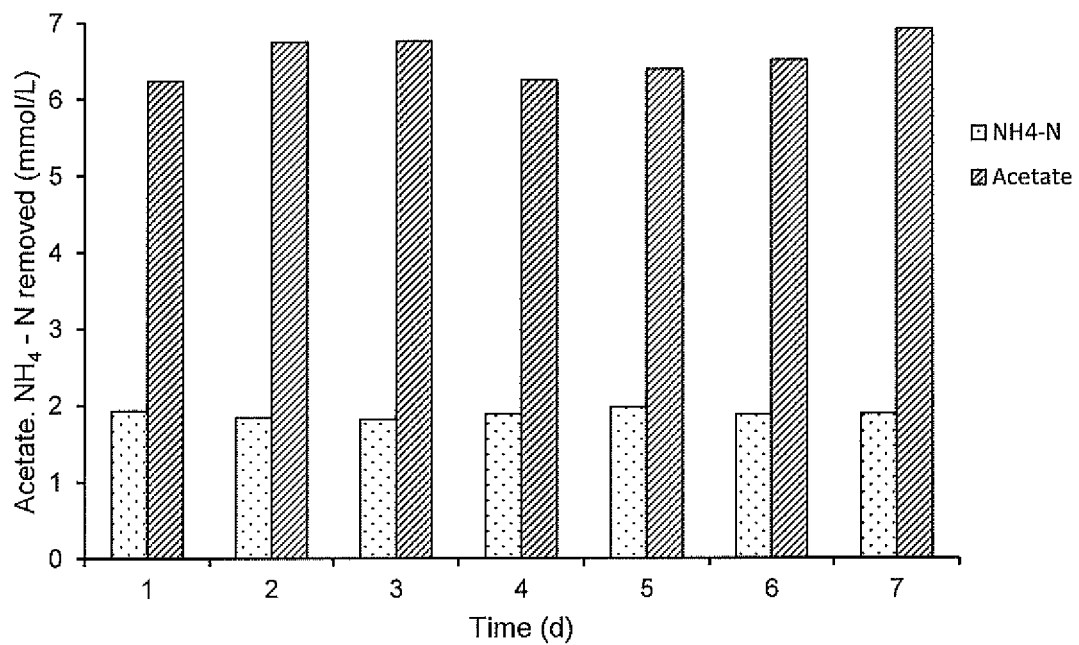
FIG. 8: Stable acetate and $NH_4$—N removal by zeolite containing sequencing batch biofilm reactor over a period of one week.

The glycogen accumulating organism (GAO) dominated biofilm was coated with 10 g zeolite powder (size: 75-150 µm). The biofilm was now able to adsorb $NH_4$—N from the wastewater. Activated sludge was trickled over the zeolite coated biofilm. The microorganisms present in the activated sludge helps to regenerate the zeolite. The produced $NO_2^-$/$NO_3^-$ was immediately denitrified using stored PHA by GAO. The biofilm showed consistent removal of carbon and nitrogen over several weeks (FIG. 8).

Figure 9:
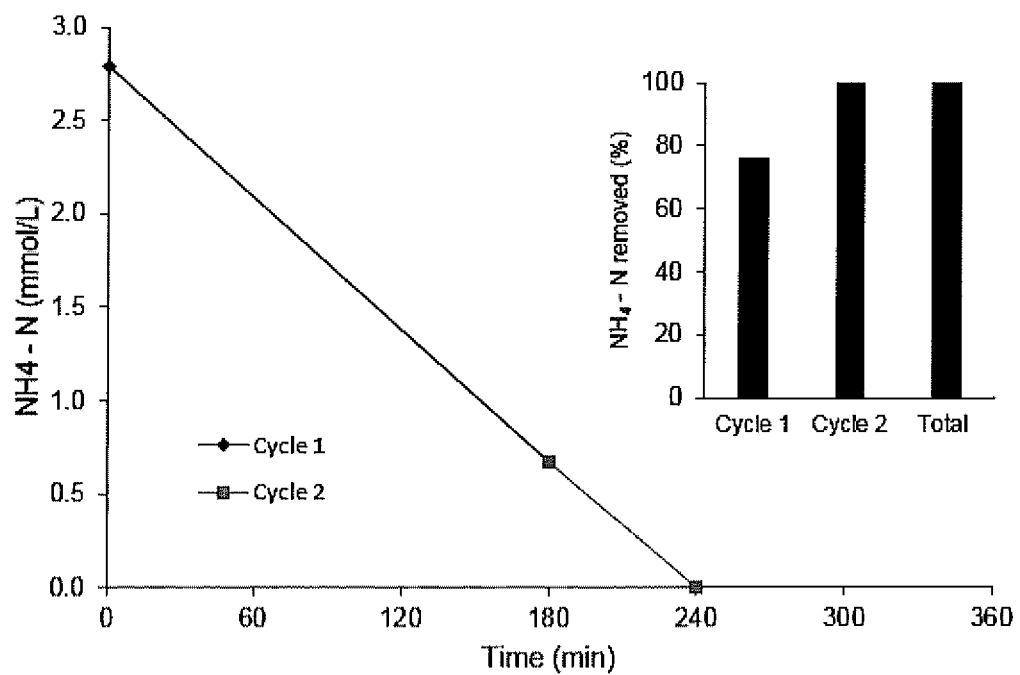
FIG. 9: Treatment of wastewater in two successive cycles: Synthetic wastewater was treated twice in Zeolite containing sequencing batch biofilm reactor, resulting complete nitrogen removal (inset).

The biofilm reactor removed about 70% nitrogen from wastewater during the anaerobic phase. The remaining 30% nitrogen was treated using a second reactor. The second reactor was filled with drained effluent and found that the remaining nitrogen was removed in the subsequent treatment resulting in almost complete nitrogen removal (FIG. 9).

Those skilled in the art will appreciate that the invention described herein is susceptible to variations and modifications other than those specifically described. The invention includes all such variation and modifications. The invention also includes all of the steps, features, formulations and compounds referred to or indicated in the specification, individually or collectively and any and all combinations or any two or more of the steps or features.

The present invention is not to be limited in scope by any of the specific embodiments described herein. These embodiments are intended for the purpose of exemplification only. Functionally equivalent products, formulations and methods are clearly within the scope of the invention as described herein.

The invention described herein may include one or more range of values (e.g. size, displacement and field strength etc). A range of values will be understood to include all values within the range, including the values defining the range, and values adjacent to the range which lead to the same or substantially the same outcome as the values immediately adjacent to that value which defines the boundary to the range. Other definitions for selected terms used herein may be found within the detailed description of the invention and apply throughout. Unless otherwise defined, all other scientific and technical terms used herein have the same meaning as commonly understood to one of ordinary skill in the art to which the invention belongs. The term "active agent" may mean one active agent, or may encompass two or more active agents.

The invention claimed is:

1. A method for the treatment of water, the method comprising the steps of:
   anaerobic uptake and storage of at least a portion of the organic components in the water by a heterotrophic denitrifying biomass;
   absorption of ammonium ions with an ammonium ion absorbent; and
   aerobic oxidation of the absorbed ammonium by a nitrifying biomass comprising ammonium oxidizing microorganisms,
   wherein the step of aerobic oxidation of the absorbed ammonium is preceded by the step of exposing at least a portion of the nitrifying biomass to atmospheric oxygen.

2. The method for the treatment of water in accordance with claim 1, wherein the oxidation of the ammonium provides nitrite and/or nitrate ions which serve as the electron acceptors for denitrification with the absorbed or stored organics acting as electron donors.

3. The method for the treatment of water in accordance with claim 2, wherein the nitrate and/or nitrite formed is reduced by the heterotrophic denitrifying biomass resulting in net N removal via $N_2$ production.

4. The method for the treatment of water in accordance with claim 1, wherein heterotrophic denitrifying biomass and the nitrifying biomass are mixed to provide a mixed biomass.

5. The method for the treatment of water in accordance with claim 1, wherein the heterotrophic denitrifying biomass is provided on a carrier.

6. The method for the treatment of water in accordance with claim 1, wherein the nitrifying biomass is provided on a carrier.

7. The method for the treatment of water in accordance with claim 5, wherein the heterotrophic denitrifying biomass and/or the nitrifying biomass and/or the mixed biomass is provided on a carrier.

8. The method for the treatment of water in accordance with claim 1, wherein the ammonium ion absorbent is provided on a carrier.

9. The method for the treatment of water in accordance with claim 5, wherein the ammonium ion absorbent acts as the carrier for either or both of the heterotrophic denitrifying biomass and the nitrifying biomass.

10. The method for the treatment of water in accordance with claim 1, wherein two or more of the heterotrophic denitrifying biomass, the ammonium ion absorbent and the nitrifying biomass are on the same carrier.

11. The method for the treatment of water in accordance with claim 1, wherein the step of exposing at least a portion of the nitrifying biomass and/or heterotrophic denitrifying biomass to atmospheric oxygen comprises removing at least a portion of the water from the nitrifying biomass.

12. The method for the treatment of water in accordance with claim 1, wherein the step of exposing at least a portion of the nitrifying biomass and/or heterotrophic denitrifying biomass to atmospheric oxygen comprises lifting at least a portion of the carrier with biomass above the water level.

13. The method for the treatment of water in accordance with claim 12, wherein the step of exposing the nitrifying biomass and/or heterotrophic denitrifying biomass to atmospheric oxygen is accompanied by ventilated air.

14. The method for the treatment of water in accordance with claim 1, comprising repeating the steps of anaerobic treatment and aerobic treatment.

15. The method for the treatment of water in accordance with claim 1, wherein the denitrifying biomass and the nitrifying biomass are spatially separated.

16. The method for the treatment of water in accordance with claim 1, wherein the heterotrophic denitrifying biomass is composed of microbes.

17. The method for the treatment of water in accordance with claim 1, wherein the heterotrophic denitrifying biomass is composed of bacteria, wherein the bacteria is selected from the group consisting of *Pseudomonas denitrificans, Aquaspirillium, Agrobacteria, Chromobacteria, Neisseria, Bacilli* and *Thiobacilli*.

18. The method for the treatment of water in accordance with claim 1, wherein the heterotrophic denitrifying biomass is composed of bacteria that are capable of converting carbon into polymeric storage products and converting nitrate or nitrite into nitrogen gas.

19. The method for the treatment of water in accordance with claim 1, wherein the nitrifying biomass comprise Anammox bacteria and/or bacteria of the genus *Nitrosomonas* and *Nitrospria*.

20. The method for the treatment of water in accordance with claim 1, wherein the nitrification and denitrification are simultaneous, whereby regeneration of the ion absorbent and subsequent SND is achieved by action of the nitrifying and heterotrophic denitrifying biomass and/or Anammox bacteria.

21. The method for the treatment of water in accordance with claim 1, wherein the heterotrophic denitrifying biomass and/or the nitrifying biomass are provided as biofilms.

22. The method for the treatment of water in accordance with claim 1, wherein the ammonium ion absorbent is an ion exchange resin.

23. The method for the treatment of water in accordance with claim 1, wherein the ammonium ion absorbent is selected from the group consisting of zeolite, clinoptilolite, phillipsite, and mordenite or other natural or synthetic ion exchange materials.

24. The method for the treatment of water in accordance with claim 5, wherein the ammonium ion absorbent is permanently or semi-permanently attached to the carrier.

25. The method for the treatment of water in accordance with claim 1, wherein the ammonium ion absorbent is integrated into the heterotrophic denitrifying biomass and/or the nitrifying biomass or the mixed biomass.

26. The method for the treatment of water in accordance with claim 5, wherein the ammonium ion absorbent is provided in a useful form that offers sufficient surface area and voids for drainage and air supply and carrier is the ammonium ion absorbent.

\* \* \* \* \*